US010628895B2

(12) United States Patent
Xu et al.

(10) Patent No.: US 10,628,895 B2
(45) Date of Patent: Apr. 21, 2020

(54) GENERATING DIGITAL MODELS OF RELATIVE YIELD OF A CROP BASED ON NITRATE VALUES IN THE SOIL

(71) Applicant: THE CLIMATE CORPORATION, San Francisco, CA (US)

(72) Inventors: Lijuan Xu, Foster City, CA (US); Ying Xu, Boston, MA (US); Ankur Gupta, San Francisco, CA (US)

(73) Assignee: The Climate Corporation, San Francisco, CA (US)

( * ) Notice: Subject to any disclaimer, the term of this patent is extended or adjusted under 35 U.S.C. 154(b) by 431 days.

(21) Appl. No.: 14/968,728

(22) Filed: Dec. 14, 2015

(65) Prior Publication Data

US 2017/0169523 A1 Jun. 15, 2017

(51) Int. Cl.
*G06Q 50/02* (2012.01)
*A01B 79/00* (2006.01)
(Continued)

(52) U.S. Cl.
CPC .......... *G06Q 50/02* (2013.01); *A01B 79/005* (2013.01); *A01C 21/00* (2013.01); *G06Q 10/067* (2013.01); *G06Q 10/06315* (2013.01)

(58) Field of Classification Search
USPC ...................................................... 705/7.25
See application file for complete search history.

(56) References Cited

U.S. PATENT DOCUMENTS

| 5,033,397 A * | 7/1991 | Colburn, Jr. ......... | A01B 79/005 111/118 |
| 2003/0019151 A1* | 1/2003 | Raun .................... | A01C 21/007 47/58.1 SC |

(Continued)

FOREIGN PATENT DOCUMENTS

WO WO01/95163 A1 12/2001

OTHER PUBLICATIONS

Limon et al. (Multicriteria analysis of derived water demand functions: a Spanish case study, JA Gomez-Limon, Agricultural Systems 63 (2000), Elsevier, accepted Dec. 1999, pp. 49-72).*

Limon et al. (Multicriteria analysis of derived water demand functions: a Spanish case study, JA Gomez-Limon, Agricultural Systems 63 (2000), Elsevier, accepted Dec. 1999).*

Paz et al., "Model-based Technique to Determine Variable Rate Nitrogen for Corn", Agricultural Systems dated Jul. 1999, vol. 61, Issue 1, pp. 69-75.

(Continued)

*Primary Examiner* — Johnna R Loftis
*Assistant Examiner* — Matthew D Henry
(74) *Attorney, Agent, or Firm* — Elliot H. Karlin; Hickman Palermo Becker Bingham LLP

(57) ABSTRACT

A computer implemented method for generating digital models of relative crop yield based on nitrate values in the soil is provided. In an embodiment, nitrate measurements from soil during a particular portion of a crop's development and corresponding crop yields are received by an agricultural intelligence computing system. Based, at least in part, on the nitrate measurements and corresponding crop yields, the system determines maximum yields for each location of a plurality of locations. The system then converts each crop yield value into a relative crop yield by dividing the crop yield value by the maximum crop yield for the location. Using the relative crop yields and the corresponding nitrate values in the soil, the system generates a digital model of relative crop yield as a function of nitrate in the soil during the particular portion of the crop's development. When the system receives nitrate measurements from soil in a particular field during the particular portion of a crop's development, the system computes a relative yield value for the particular field using the model of relative crop yield.

12 Claims, 9 Drawing Sheets

(51) Int. Cl.
*A01C 21/00* (2006.01)
*G06Q 10/06* (2012.01)

(56) References Cited

U.S. PATENT DOCUMENTS

| | | | |
|---|---|---|---|
| 2003/0019408 A1* | 1/2003 | Fraisse | A01B 49/06 111/100 |
| 2005/0234691 A1* | 10/2005 | Singh | G06Q 10/04 703/11 |
| 2007/0186830 A1 | 8/2007 | Fraisse et al. | |
| 2009/0093998 A1* | 4/2009 | Fluegge | G06Q 10/06 702/182 |
| 2013/0046468 A1 | 2/2013 | Baker et al. | |
| 2014/0012732 A1* | 1/2014 | Lindores | A01B 79/005 705/37 |
| 2014/0273253 A1 | 9/2014 | Roberts et al. | |
| 2015/0254800 A1 | 9/2015 | Johnson et al. | |
| 2016/0042232 A1* | 2/2016 | Scharf | G06Q 10/06315 382/110 |

OTHER PUBLICATIONS

International Searching Authority, "Search Report" in application No. PCT/US16/63295, dated Feb. 1, 2017, 8 pages.
Current Claims in application No. PCT/US16/63295, dated Feb. 2017, 11 pages.
The International Bureau of WIPO, "Search Report" in application No. PCT/US2016/063295, dated Jun. 28, 2018, 7 pages.
Current Claims in application No. PCT/US2016/063295, dated Jun. 2018 11 pages.
European Patent Office, "Search Report" in application No. 16876347.2-1222, dated Apr. 2, 2019, 7 pages.
European Claims in application No. 16876347.2-1222, dated Apr. 2019, 10 pages.
Brazil Patent Office, "Search Report" in application No. BR112018011989-0, dated Dec. 17, 2019, 2 pages.
Brazil Claims in application No. BR112018011989-0, dated Dec. 2019, 11 pages.

* cited by examiner

Fig. 2
(a)
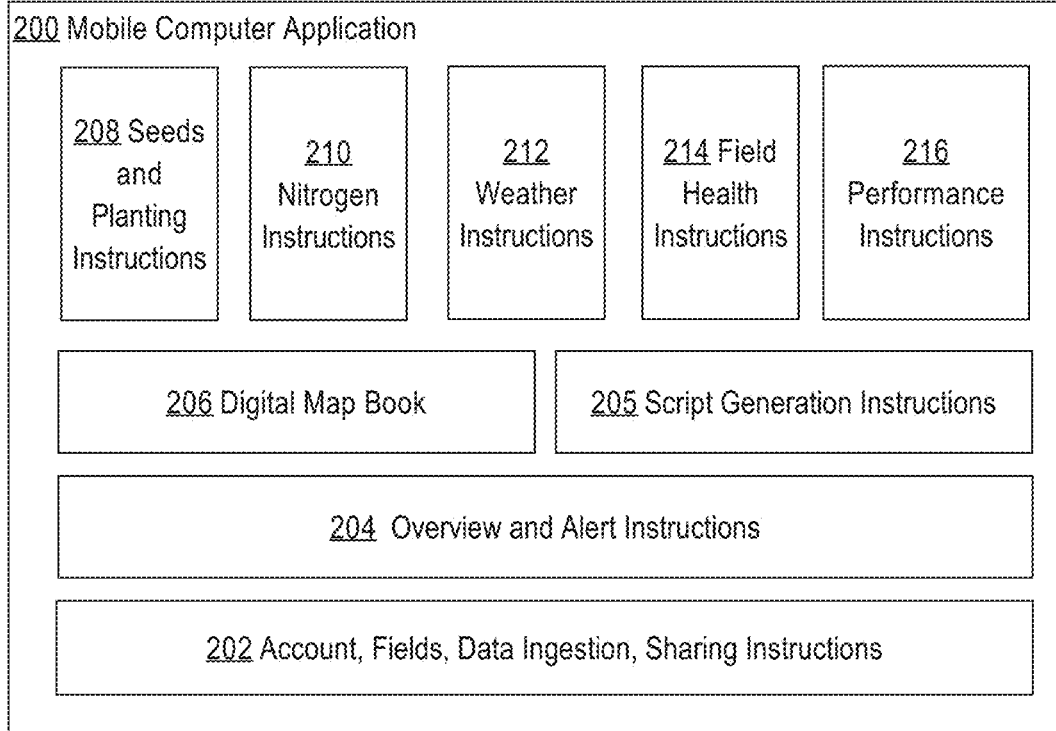
(b)
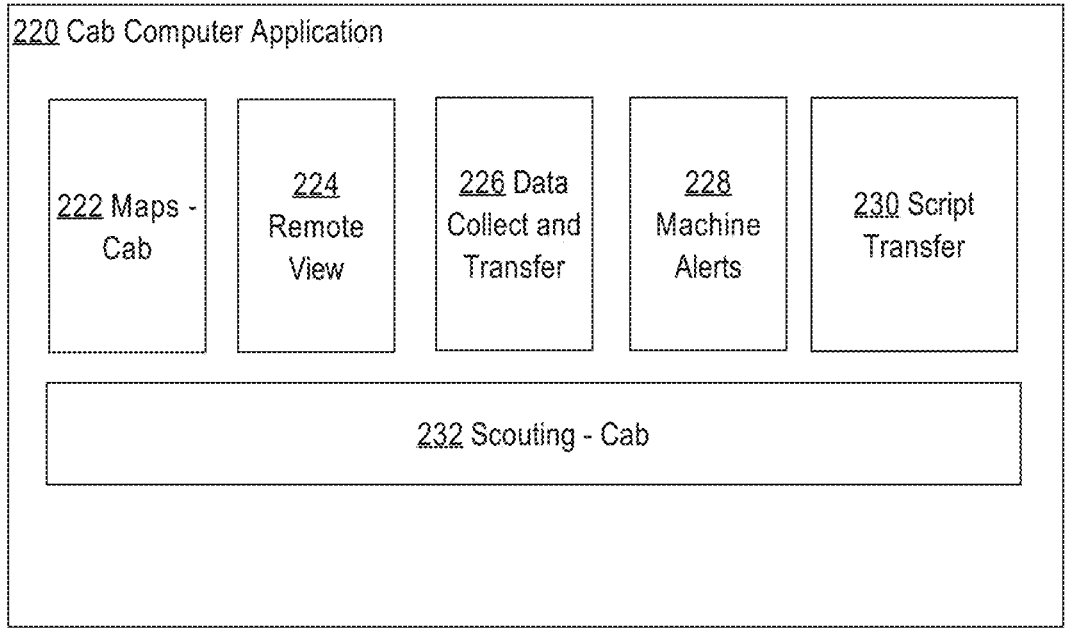

Data Manager

Nitrogen | Planting | Practices | Soil

| Planting 1(4 Fields) | Planting 2(0 Fields) | Planting 3(0 Fields) | Planting 4(1 Fields) |
|---|---|---|---|
| Crop Corn Product | Crop Corn Product | Crop Corn Product | Crop Corn Product |
| Plant Date: 2016-04-12 | Plant Date: 2016-04-15 | Plant Date: 2016-04-13 | Plant Date: 2016-04-13 |
| ILU 112 \| Pop: 34000 | ILU 83 \| Pop: 34000 | ILU 83 \| Pop: 34000 | ILU 112 \| Pop: 34000 |
| [Edit] [Apply] | [Edit] [Apply] | [Edit] [Apply] | [Edit] [Apply] |

[+ Add New Planting Plan]

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1<br>Corn \| 100 \| Boone, IA | Corn | — | DMC82-M | 112 | 160 | 34000 | Apr |
| ☐ Austin, MN 1<br>Corn \| 100 \| Fredricks, MN | Corn | — | DMC82-M | 114 | 160 | 36000 | Apr |
| ☐ Boone, IN 1<br>Corn \| 100 \| Boone, IA | Corn | — | — | 112 | 150 | 34000 | Apr |
| ☐ Champaign 1<br>Corn \| 100 \| Champaign, IL | Corn | — | — | 112 | 200 | 34000 | Apr |
| ☐ E Nebraska 1<br>Corn \| 100 \| Burt, NE | Corn | — | — | 112 | 160 | 34000 | Apr |

GDD cut off values for corn

| Stage | V2 | V4 | V6 | V8 | V10 | V12 | V14 | V16 | R1 | R2 | R3 | R4 | R5 | R5.5 | R6 |
|---|---|---|---|---|---|---|---|---|---|---|---|---|---|---|---|
| GDD | 177 | 306 | 421 | 540 | 655 | 771 | 886 | 1005 | 1240 | 1526 | 1818 | 2120 | 2281 | 2499 | 2700 |

GENERATING DIGITAL MODELS OF RELATIVE YIELD OF A CROP BASED ON NITRATE VALUES IN THE SOIL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015 The Climate Corporation.

FIELD OF THE DISCLOSURE

The present disclosure relates to digital computer modeling of relative crop yield based on nitrate in the soil using historical nitrate and yield data received over a network. Additionally, the present disclosure relates to computing optimal nitrogen applications and sending nitrogen application recommendations to a field manager computing device over a network.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A farmer often faces difficult decisions when it comes to management of the farmer's crops. One such decision involves the application of nitrogen to a field during a crop's development. Many crops need access to nitrogen or nitrate in order to reach their maximum potential. A farmer may be aware that the farmer's crops will reach their maximum potential with the proper amount of nitrogen, but be unable to determine the optimal amount of nitrogen to apply to the field, when to apply the nitrogen, or whether application of nitrogen to the field is worth the cost of the nitrogen.

Application of nitrogen to the soil usually occurs early on in a crop's development. Machines that apply nitrogen to corn through side dressing often are unable to apply nitrogen past a certain point in the corn crop's development when the corn crop has grown too large. Thus, a cutoff point of nitrogen application generally exists around the V6 to V8 growth stages of the corn crop. For a farmer to apply the optimal amount of nitrogen, the farmer must understand the optimal amount of nitrogen to apply during the early stages so that the crop has sufficient nitrogen throughout the later stages of the crops development when applying additional nitrogen is impractical.

The optimal amount of nitrogen often varies from field to field, making it difficult for a farmer to follow a uniform rule in applying nitrogen. This occurs because different fields undergo different weather conditions and contain different soil compositions. Wetter fields tend to lose nitrogen and nitrate faster than dryer fields due to nitrogen leaching. While uniform rules for nitrogen application have been developed, they fail to take into account the locational dependence of the optimal application of nitrogen to the soil.

As the optimal nitrogen varies from field to field, the effects of each nitrogen application also vary from field to field. In some cases, a small amount of nitrogen may cause a large change in the total yield for a crop in one location while a large amount of nitrogen may be required to cause the same change in the total yield for a crop in a second location. Before a farmer decides to add nitrogen to the field, the farmer would want to know how the application would affect the total yield of the farmer's crop in order to determine whether the application of nitrogen is preferable to not applying the nitrogen.

There is a need for a system which identifies the effects of different applications of nitrogen to the total yield of a crop. Specifically, there is a need for a system that takes into account the location of the crop in order to accurately model the changes in the yield of a particular crop on a particular field based on a particular application of nitrogen.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

FIG. 9 illustrates an example chart where the number of growing degree days are used to define the start and end of different phenological development stages.

DETAILED DESCRIPTION

Figure 1:
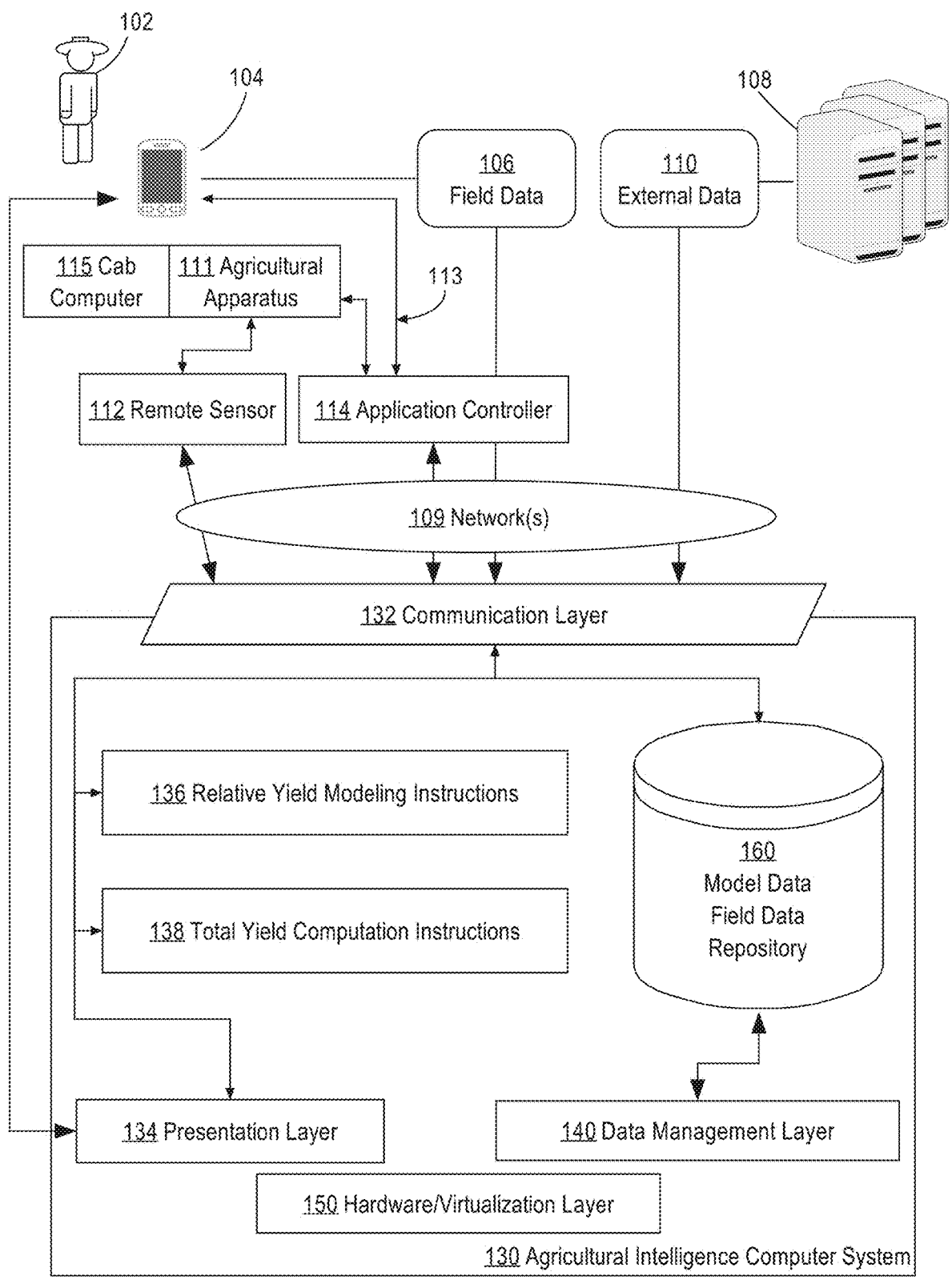
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
    2.1. STRUCTURAL OVERVIEW
    2.2. APPLICATION PROGRAM OVERVIEW
    2.3. DATA INGEST TO THE COMPUTER SYSTEM 2.4. PROCESS OVERVIEW—AGRONOMIC MODEL TRAINING
2.5. IMPLEMENTATION EXAMPLE—HARDWARE OVERVIEW
3. CROP YIELD MODELING
3.1. RECEIVED DATA
3.2. MAXIMUM AND RELATIVE CROP YIELDS
3.3. MODELING EFFECTS OF NITRATE ON RELATIVE CROP YIELD
4. MODEL USAGE
4.1. ESTIMATING RELATIVE CROP YIELD
4.2. NITROGEN APPLICATION RECOMMENDATIONS
4.3. CROP YIELD MODELING
5. BENEFITS OF CERTAIN EMBODIMENTS
6. EXTENSIONS AND ALTERNATIVES

1. GENERAL OVERVIEW

Aspects of the disclosure generally relate to computer-implemented techniques for generating relative yield models and transmitting crop yield data to a computing device. In an embodiment, an agricultural intelligence computing system is programmed or configured to receive, over a network, crop yield data for a plurality of fields with corresponding nitrate measurements during a portion of the crop's development. The agricultural intelligence computing system identifies a maximum yield for each location of a plurality of locations and converts the crop yield data into relative crop yields using the maximum yield for each location. The system then models the relative yield of the crop as a function of nitrate in the soil. When the system receives, over a network, a nitrate measurement for a particular field, the system computes a relative crop yield for the particular field using the model of relative yield.

According to an embodiment, a method comprises receiving, over a network at a server computer comprising one or more processors and digital memory, first electronic digital data comprising a plurality of values representing, for each location of a plurality of locations, nitrate measurements in soil during a particular portion of a crop's development; receiving, over a network at the server computer, second electronic digital data comprising a plurality of values representing, for each location of the plurality of locations, crop yields corresponding to the nitrate measurements in soil; using digitally programmed instructions in the server computer, determining, based, at least in part, on the nitrate measurements in soil and the crop yields corresponding to the nitrate measurements, for each location of the plurality of locations, a maximum yield of the crop with sufficient nitrate; using digitally programmed instructions in the server computer, computing, for each location of the plurality of locations, a plurality of relative yield values comprising a crop yield of the crop yields corresponding to nitrate measurements divided by the maximum yield of the crop with sufficient nitrate; using digitally programmed instructions in the server computer, generating a digital model of relative crop yield as a function of nitrate in soil during the particular portion of a crop's development based, at least in part, on the plurality of relative yield values and the nitrate measurements in soil; receiving, over a network at the server computer, third electronic digital data comprising one or more values representing, for a particular location, one or more nitrate measurements in soil during the particular portion of a crop's development; using digitally programmed instructions in the server computer, computing a particular relative yield for the particular location based, at least in part, on the one or more nitrate measurements in soil for the particular location and the digital model of relative crop yield.

2. EXAMPLE AGRICULTURAL INTELLIGENCE COMPUTER SYSTEM 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

An external data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server computer 108 owned by the same entity that owns and/or operates the agricultural intelligence computer system 130. For example, the agricultural intelligence computer system 130 may include a data server focused exclusively on a type of that might otherwise be obtained from third party sources, such as weather data. In some embodiments, an external data server computer 108 may actually be incorporated within the system 130.

An agricultural apparatus 111 has one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a color graphical screen display that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
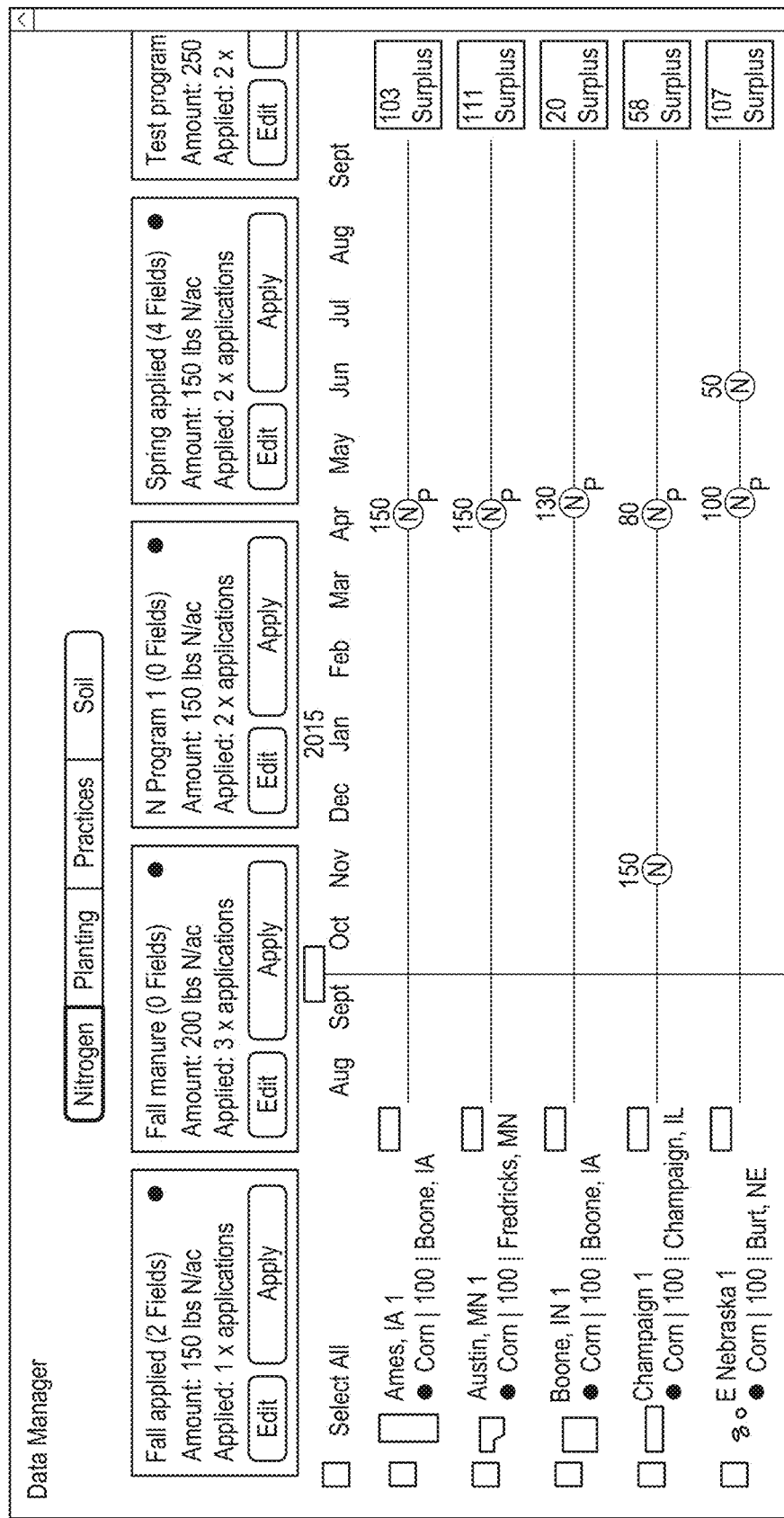
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model data may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In one embodiment, each of the relative yield modeling instructions 136 and total yield computation instructions 138 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the relative yield modeling instructions 136 may comprise executable instructions loaded into a set of pages in RAM that contain instructions which when executed cause performing the relative yield modeling functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of the relative yield modeling instructions 136 and total yield computation instructions 138 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130. The executable instructions in memory, or the stored source code, specified in this paragraph are examples of "modules" as that term is used in this disclosure.

Relative yield modeling instructions 136 generally represent digitally programmed instructions which, when executed by one or more processors of agricultural intelligence computer system 130 cause agricultural intelligence computer system 130 to perform translation and storage of data values and construction of digital models of relative crop yield based on nitrate values. Total yield computation instructions 138 generally represent digitally programmed instructions which, when executed by one or more processors of agricultural intelligence computer system 130 cause agricultural intelligence computer system 130 to perform translation and storage of data values, construction of digital models of total crop yield, and computation of total crop yield based, at least in part, on the relative crop yield.

Figure 4:
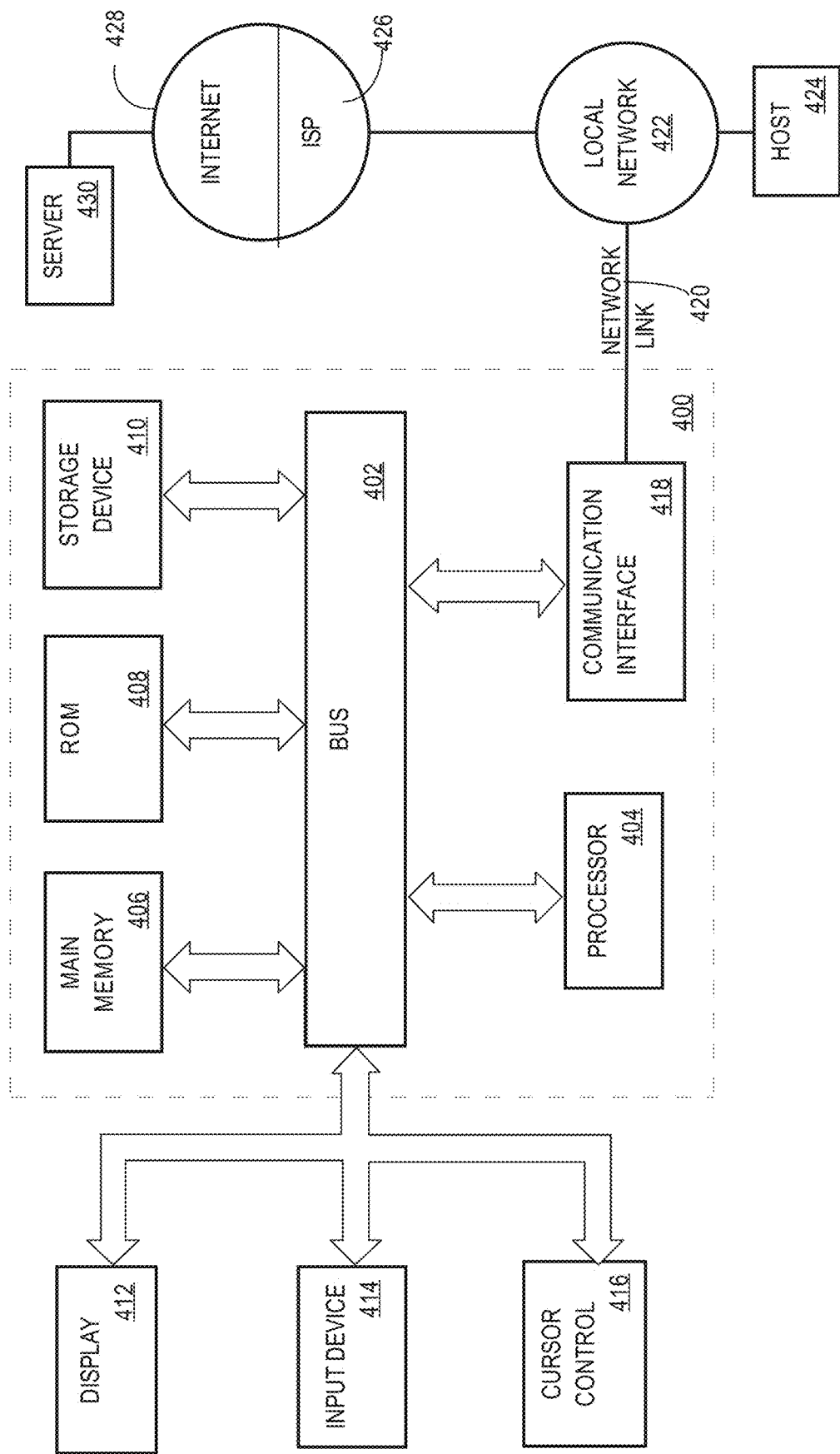
FIG. 4 is a block diagram that illustrates a computer system 400 upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into soil zones along with a panel identifying each soil zone and a soil name, texture, and drainage for each zone. Mobile computer application 200 may also display tools for editing or creating such, such as graphical tools for drawing soil zones over a map of one or more fields. Planting procedures may be applied to all soil zones or different planting procedures may be applied to different subsets of soil zones. When a script is created, mobile computer application 200 may make the script available for download in a format readable by an application controller, such as an archived or compressed format. Additionally and/or alternatively, a script may be sent directly to cab computer 115 from mobile computer application 200 and/or uploaded to one or more data servers and stored for further use. In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates:

a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and U.S. Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

2.4 Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge at the same location or an estimate of nitrogen content with a soil sample measurement.

Figure 3:
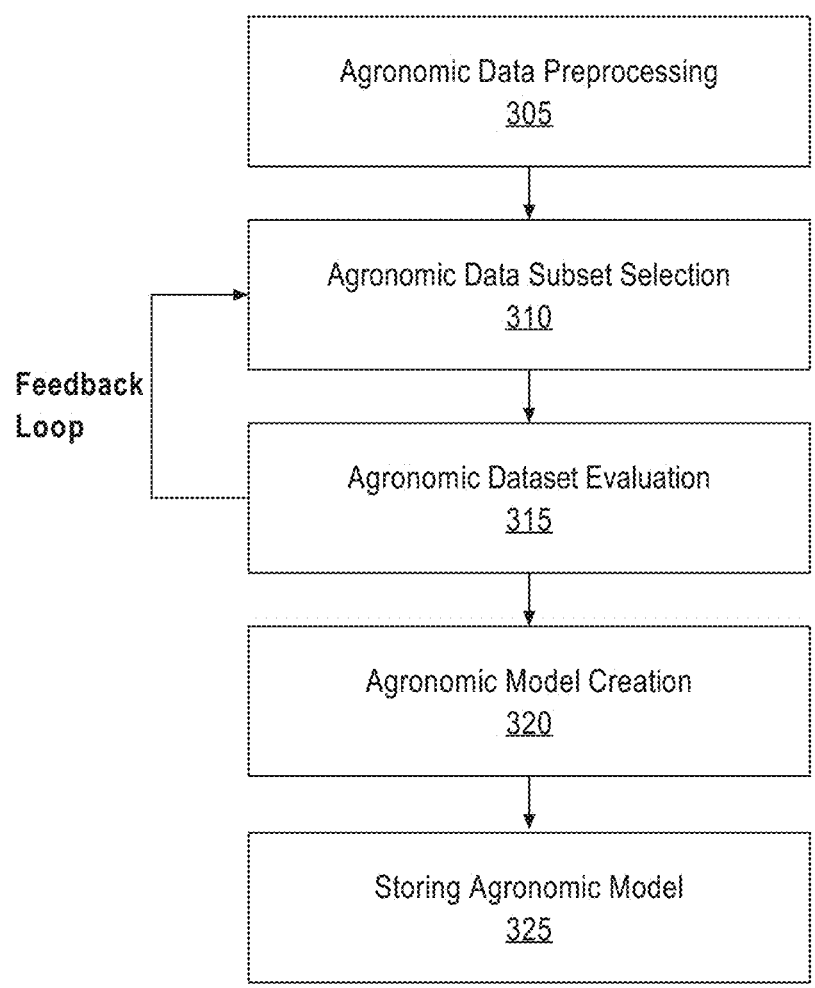
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. CROP YIELD MODELING 3.1 Received Data

Figure 7:
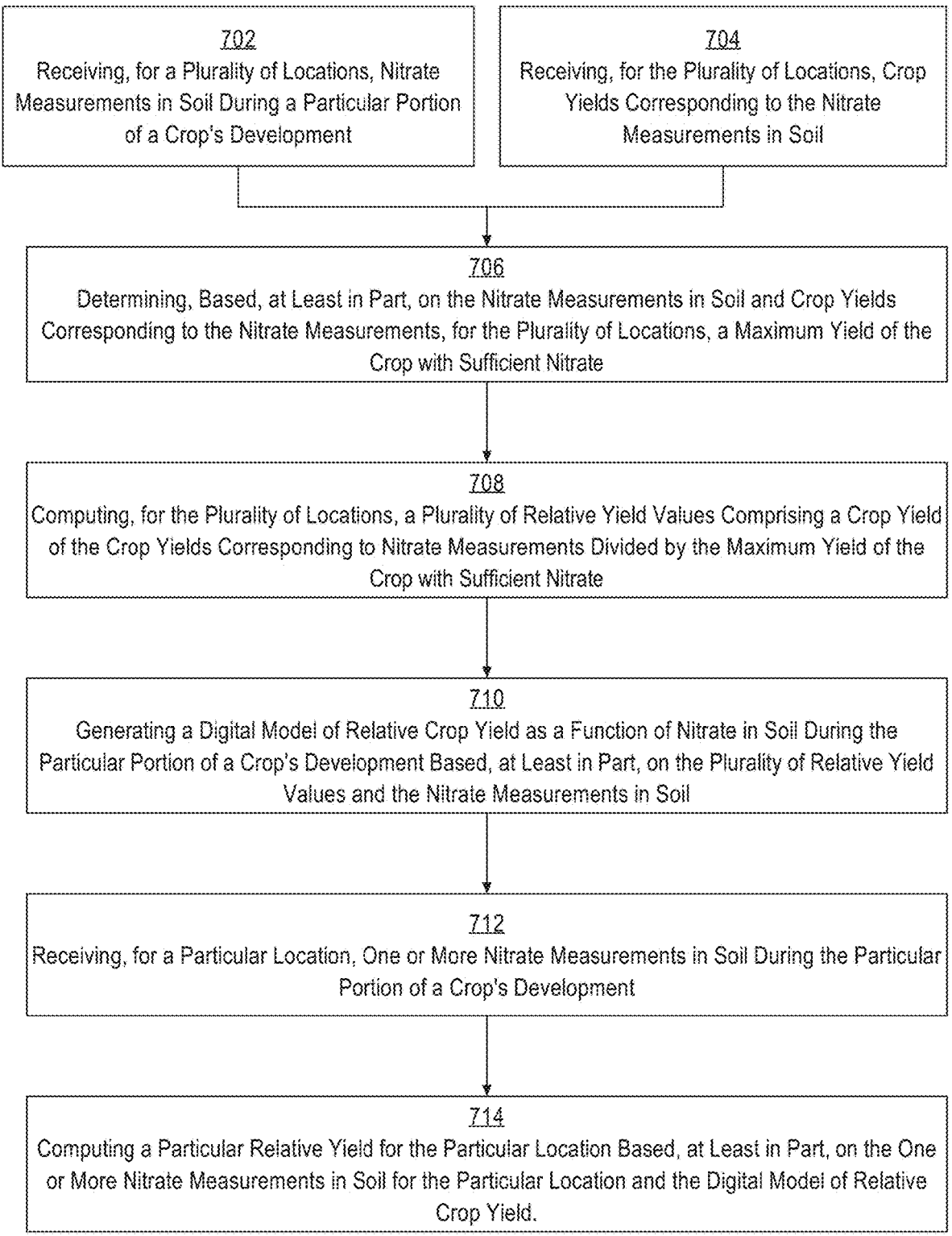
FIG. 7 depicts a method of generating and utilizing a model of relative yield based on nitrate levels in one or more fields.

FIG. 7 depicts a method of generating and utilizing a model of relative yield based on nitrate levels in one or more fields.

At step 702, nitrate measurements in soil are received for a plurality of locations. For example, agricultural intelligence computer system may receive field testing data for a plurality of locations which identifies, for each location of the plurality of locations, one or more of a date of planting a crop, a type of hybrid crop planted, a planting density of the crop, date and amount of nitrogen application, a measured amount of nitrogen or nitrate in the soil and date of measurement, and a yield of the crop. Agricultural intelligence computer system 130 may also receive data from a plurality of farmers identifying nitrate levels in the soil at a particular date and a total yield of a crop.

Figure 8:
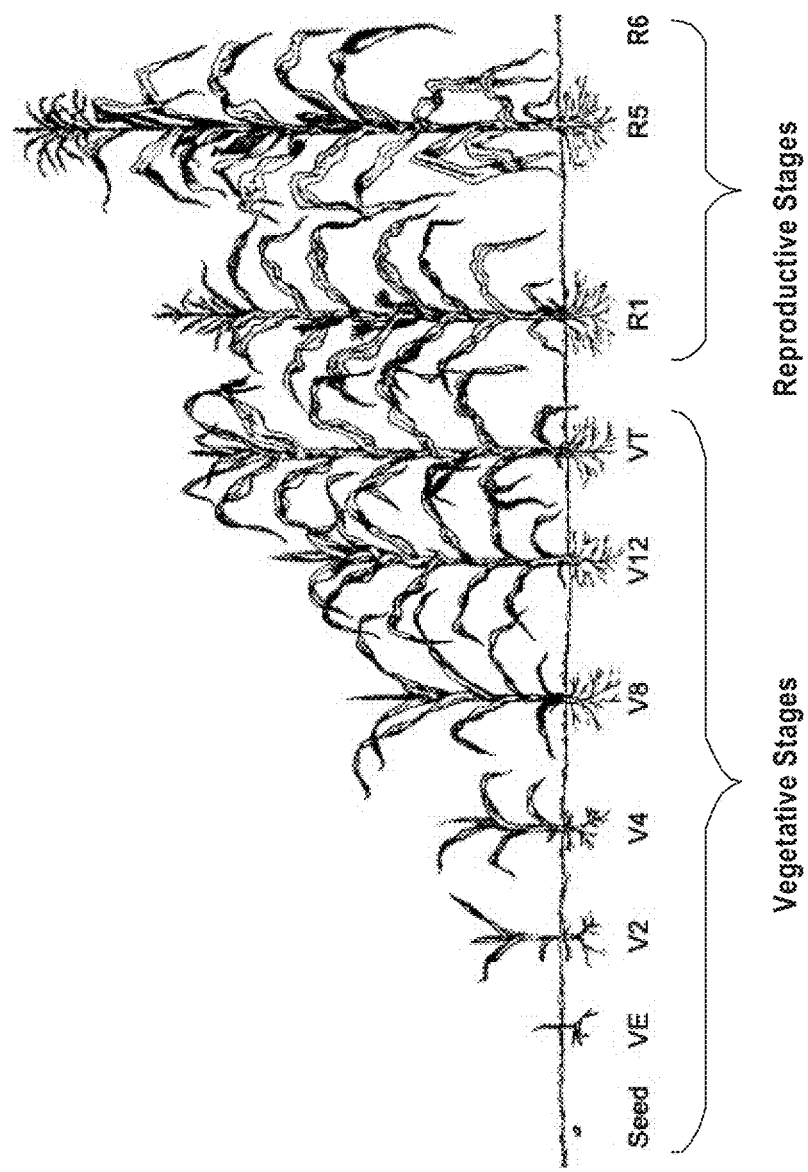
FIG. 8 illustrates an example embodiment of corn growth stages.

In an embodiment, agricultural intelligence computer system 130 models the amount of nitrate in soil at a particular date based on data identifying a date of nitrogen application to the soil. The particular date may be related to a growth stage of a crop. The lifecycle of corn plants may be measured using growth development stages starting from seeding to physiological maturity, also known as black layer. FIG. 8 illustrates an example embodiment of corn growth stages. Corn growth stages are divided into two major types of stages, vegetative and reproductive stages. Vegetative growth stages are the stages where the corn plant develops from a seed to a fully formed plant. The vegetative growth stages are characterized by the crop increasing in biomass, developing roots, stalk, and leaves, and preparing itself for reproduction. Vegetative growth stages begin with the corn emergence stage, labelled as "VE", and end with the fully visible tassel stage, "VT". Corn emergence (VE) signifies the first visible site of the corn plant from the ground. Fully visible tassel (VT) signifies the stage where the tassels, pollen producing flowers, are completely visible. Between the VE and VT stages exist multiple vegetative stages that describe the growth of the corn plant by how many uppermost leaves are visible with the leaf collar. For example, "V2" signifies the growth stage where two leaves are fully expanded with the leaf collar visible, and "V12" signifies the growth stage where twelve leaves are fully expanded with the leaf collar visible.

The phenology stages of the corn plant may be tracked based upon factors outside the appearance of the individual corn plants. For example, the phenological development of corn plants is strongly related to the accumulation of heat by the corn plants, which furthers corn plant growth. The accumulation of heat may be measured by daily maximum and minimum temperatures. In an embodiment, growing degree days (GDD) are used to track the different developmental stages of corn plant growth. GDD may be calculated using different observational data and different thresholds. For example, GDD may be calculated as:

$$\text{Daily } GDD = \frac{T_{max} + T_{min}}{2} - T_{base}$$

where $$\frac{T_{max} + T_{min}}{2}$$

is the daily average temperature calculated from the daily maximum and minimum temperatures. $T_{base}$ is a lower threshold temperature where no significant corn plant growth occurs. In an embodiment, cutoff values may be set for $T_{max}$ and $T_{min}$. For example, a cutoff value of 86° F. may be set for $T_{max}$ such that $T_{max}$ is set to 86° F. when temperatures exceed 86° F. and a cutoff value of 50° F. may be set for $T_{min}$ such that $T_{min}$ is set to 50° F. when temperatures fall below 50° F.

Therefore when the daily average temperature does not exceed the lower threshold temperature, no growth in the corn plant occurs. FIG. 9 illustrates an example chart where the number of growing degree days are used to define the start and end of different phenological development stages. For example, after 177 GDDs the V2 stage of the corn plant starts. At GDD 1240, the first reproductive stage, R1, begins. While FIG. 9 generally illustrates different phenological development stages for a particular crop, in an embodiment different hybrid seed types may enter phenological stages at different times. For example, the cutoff for the V2 stage of a corn plant with a higher relative maturity value than the one depicted in FIG. 9 may occur after 177 GDDs. Measuring GDDs is particularly useful when determining specific nitrogen values that correlate to different development stages in corn plant growth. In an embodiment, agricultural intelligence computer system 130 uses received temperature data to convert a time period into GDDs for each plant. The received or modeled nitrogen values may then be associated with a period of development of a crop by being compared to the growing degree days for the crop.

In an embodiment, agricultural intelligence computer system 130 receives or models nitrate values for the fields between the V6 and V8 growth stages. The V6 to V8 stages are important because they often represent a last opportunity to apply fertilizer to a field through side dressing using particular types of farming equipment. For example, some types of equipment are unable to perform side dressing after the V8 growth stage because the crop is too for the equipment. Nitrate values may also be received or modeled for different periods of crop growth, such as any point between planting to V6 and V8 to harvest. While the V6 through V8 growth stages often represent a last opportunity to apply nitrogen through side dressing, applications of nitrogen before the V6 stage may be important to farmers based on different constraints. Additionally, some equipment may be able to apply nitrogen through side dressing up through V10. Given the variance of possibilities in nitrogen application, agricultural intelligence computer system 130 may model nitrate in the soil at various points outside of V6 through V8 to create better application recommendations.

In an embodiment, agricultural intelligence computer system 130 models nitrogen or nitrate values in soil based on initial measurements of nitrogen or nitrate in the soil or based on nitrogen application data. For example, a particular data source may indicate, for a particular planting date, year, and hybrid seed type, a plurality of different nitrogen applications to a plurality of fields. Agricultural intelligence computer system 130 may also receive weather data identifying temperatures and precipitation for the plurality of locations and soil data identifying a soil type of each location of the plurality of locations. Using the received data, agricultural intelligence computer system 130 may model the nitrogen in the soil at a particular portion of the crop's development based on nitrogen uptake, leaching, denitrification, and volatilization using modeling techniques such as those described in U.S. patent application Ser. No. 14/842,321, the entire contents of which are hereby incorporated by reference as if fully set forth herein. The models of nitrogen or nitrate in the soil may be used to identify nitrate contents in the soil for a plurality of days within a particular time period, such as all days between V6 and V8. Additionally, agricultural intelligence computer system 130 may receive first data identifying nitrogen applications at the time of planting and nitrogen measurements taken at different points during V6 to V8 growth stages. If agricultural intelligence computer system 130 then receives second data identifying only nitrogen applications at the time of planting, agricultural intelligence computer system 130 may estimate the nitrogen available at different points during V6 to V8 growth stages based on correlations in the first data.

At step 704, crop yields corresponding to the nitrate measurements are received for the plurality of locations. For example, agricultural intelligence computer system 130 may initially receive, for each field, nitrate data identifying applied, measured, or modeled amounts of nitrate in the field and crop yield data identifying a total yield for the field. In an embodiment, the crop yield data includes crop yields for fields which have received sufficient nitrate in each location. For example, a plurality of fields in a first location may receive varying amounts of nitrate at the V6 stage. One of the plurality of fields may receive an abundance of nitrate to ensure that at least one field has received sufficient nitrate.

3.2 Maximum and Relative Crop Yields

At step 706, a maximum yield of a crop with sufficient nitrate is determined for a plurality of locations based, at least in part, on the nitrate measurements in soil and crop yields. For example, agricultural intelligence computer system 130 may compute a maximum yield for each location from the received crop yields. Additionally, maximum yields may be computed for a combination of each location and one or more of planting date, seed hybrid type, planting density, and year. For example, agricultural intelligence computer system 130 may use only yield values from a particular location on a particular year with particular planting dates, seed types, and planting densities to generate a first value of maximum yield.

In an embodiment, a maximum yield for each set of constraints is determined to be the highest yield value received for that set of restraints. In other embodiments, the maximum yield value is modeled from crop yields corresponding to fields which have received sufficient nitrate. Each yield value received from a field that has received sufficient nitrate may be assumed to be a value consistent with a normal distribution with a mean of the maximum yield. For example, agricultural intelligence computer system 130 may select a normal distribution that most accurately reflects yield measurements of crops with sufficient nitrate, such that, for each measured yield value of yield with sufficient nitrate in the soil, $$Y_{l,t}^M \stackrel{iid}{\sim} (M_{l,t}, \sigma_y^2)$$

where $Y_{l,t}^M$ is the measured yield for a location and year, $M_{l,t}$ is the modeled maximum yield for the location and year based on all measurements of yield with sufficient nitrate for the location and year, and $\sigma_y^2$ is an error that accounts for variances in the measured yields.

At step 708, a plurality of relative yield values are computed for each particular field. For example, for each yield value corresponding to a nitrate measurement, agricultural intelligence computer system 130 may compute a relative yield that describes an effect on the yield of a particular amount of nitrate in the soil. By converting the yield values into relative yield values, agricultural intelligence computer system 130 may account for differences in yield based on location and year in the model of nitrate effects on the yield of a crop.

To compute a relative yield value from a particular yield value for a particular field agricultural intelligence computer system 130 may divide the particular yield value by the modeled maximum yield for similar parameters. For example, a modeled maximum yield may be identified for a particular location and year corresponding to the particular yield value. Additionally, relative yields may be computed for particular planting dates, hybrid seed types, and planting density. Each parameter that is used to model the maximum yield decreases the range of error for the computed relative yield based on nitrate concentration because it reduces the impact of other parameters. For example, if a maximum yield value is computed from fields with varying planting dates, relative yield values computed from the maximum yield value may include variances based on effects of different planting dates on total yield.

3.3 Modelling Effects of Nitrate on Relative Yield

At step 710, a digital model of relative yield as a function of nitrate in soil is generated based, at least in part, on the plurality of relative yield values and the nitrate measurements in soil. For example, agricultural intelligence computer system 130 may generate a model of relative yield by fitting a line or curve to the values representing nitrate in the soil at a particular period of time and the relative yield of the crop. In one embodiment, agricultural intelligence computer system 130 models the relative yield as a function of applied nitrogen to the field at either the planting date or during a particular period based on received nitrogen application data and corresponding yield values. In another embodiment, agricultural intelligence computer system 130 models the relative yield as a function of nitrate in the soil during a particular period of time. For example, a first parameterization of the model of relative yield may be created for crops at a particular location at 461 GDDs while a second parameterization of the model of relative yield may be created for crops at the particular location at 540 GDDs.

In an embodiment, the model of the relative yield follows a normal distribution where the mean of the normal distribution is a quadratic-plateau function. The model of relative yield may be depicted as follows:

$$R_{l,t}(x) = \frac{Y_{l,t}(x)}{M_{l,t}} \sim N(F(x), \sigma^2)$$

where $$F(x) = \begin{cases} a(x-b)^2 + c & \text{if } 0 \leq x \leq N^0 \\ 1 & \text{if } x \geq N^0 \end{cases}$$

where $R_{l,t}(x)$ is the relative yield, x is the actual nitrate in the soil, $N^0$ is an optimal amount of nitrate for the field, and a, b, and c are parameterized based on the received data of yield values and nitrate measurements. In an embodiment, a<0, b>0, and c≥1. Agricultural intelligence computer system 130 may create a continuous function for the model of relative yield by setting $N^0$ such that $$N^0 = b - \sqrt{\frac{1-c}{a}}.$$

Thus, when $x=N^0$, the function would return 1. The function F(x) can be locational and temporally independent because it is used to sample the relative yield which already accounts for the location and temporal dependence of total yield.

In an embodiment, the actual nitrate in the above equation corresponds to a measured nitrate in the soil. For example, for each measurement of nitrate content in the soil $X_m$, the actual nitrate value in the soil may be modeled as a function of the measured nitrate content with estimated measurement errors. The model of actual nitrate content may be depicted as follows:

$$X_m = x + \epsilon$$

where $$\epsilon \sim N(0, \sigma_m^2).$$

In the example shown above, the measurement errors are assumed to be normally distributed. By accounting for measurement errors in the model of relative yield, agricultural intelligence computer system 130 is able to create probabilistic estimates of relative yield and thereby account for variations in the estimates.

As discussed above, the parameters a, b, and c may be generated for a plurality of time periods. The time periods may be individual days, individual growing degree days, ranges of days or growing degree days, or phenological stages. For example, a first set of parameters may be generated for the V6 stage while a second set of parameters is generated for the V7 stage. By parameterizing the above equation for different portions of the crop's development, agricultural intelligence computer system 130 is better able to predict an effect on relative yield of nitrate in the soil at a particular time. Given that the relative yield is assumed to not have a locational dependence, agricultural intelligence computer system 130 may use all relative yield values at all locations for a particular portion of the growing season to parameterize the above described model.

4. MODEL USAGE

4.1 Estimating Relative Crop Yield

At step 712, one or more nitrate measurements in soil are received during a particular portion of the crop's development. For example, remote sensor 112 may take nitrate measurements for a particular field using techniques such as mass spectrometry or gas chromatography of soil. Additionally and/or alternatively, agricultural intelligence computer system 130 may receive measurements from field manager computing device 104. For example, a farmer may use techniques such as mass spectrometry or gas chromatography to obtain measurements of nitrate in the soil of one or more fields. Agricultural intelligence computer system 130 may provide an interface to field manager computing device 104 for entering measurements of nitrate in the soil. The farmer may enter the nitrate measurements into the interface provided by agricultural intelligence computer system.

In an embodiment, agricultural intelligence computer system 130 also receives data identifying a current portion of the crop's development. For example, the interface provided by agricultural intelligence computer system 130 may include an option to include the growth stage of the plant, such as V5 or V6. The data identifying the current portion of the crop's development may also include the planting date and seed type of the crop. Agricultural intelligence computer system 130 may use received weather data, a date of the nitrate measurement, and the planting date and seed type of the crop to identify the portion of the crop's development. For example, agricultural intelligence computer system 130 may compute growing degree days for the crop based on temperature data for each date between the planting date and the date of the nitrate measurements.

In an embodiment, agricultural intelligence computer system 130 receives data identifying nitrogen applications to the soil. In embodiments where the model of relative yield is based on nitrogen application amounts instead of nitrate in the soil, agricultural intelligence computer system 130 may compute relative yield values based on the application of nitrogen. Additionally, agricultural intelligence computer system 130 may model the amount of nitrogen in the soil at particular portions of the crop's development based on the application of nitrogen. For example, if agricultural intelligence computer system 130 receives data indicating that a farmer just added nitrogen to the soil through side dressing, agricultural intelligence computer system 130 may model the effects of the application on the nitrate in the soil using techniques described herein and in U.S. patent application Ser. No. 14/842,321. As another example, agricultural intelligence computer system 130 may receive data identifying an initial application of nitrogen in the soil at the planting of the crop or a composition of the soil at the planting of the crop. Using techniques described in U.S. patent application Ser. No. 14/842,321, agricultural intelligence computer system 130 may model the amount of nitrate in the soil during a portion of the crop's development.

At step 714, a particular relative yield is computed for the particular location based, at least in part, on the one or more nitrate measurements in soil for the particular location and the digital model of relative crop yield. Agricultural intelligence computer system 130 may first identify a particular parameterization of the model of relative yield for the particular portion of the crop's development. For example, agricultural intelligence computer system 130 may identify the amount of nitrate in the soil of one or more particular fields in the particular location during the V6 growth stage. In response to identifying the nitrate level of the soil during the V6 growth stage, agricultural intelligence computer system 130 may identify a model of relative yield for the V6 growth stage. Additionally, if the models of relative yield are further separated by planting date, seed type, and/or planting density, agricultural intelligence computer system 130 may identify a model of relative yield that matches the planting date, seed type, and/or planting density of the one or more particular fields. Once a model has been identified, agricultural intelligence computer system 130 may compute a relative yield value for the one or more particular fields based on the nitrate measurement.

4.2 Nitrogen Application Recommendations

In an embodiment, agricultural intelligence computer system 130 uses the model of relative yield to generate recommendations for nitrogen application. For example, agricultural intelligence computer system 130 may identify the nitrate in the field during a particular portion of the crop's development, such as through received nitrate measurements and/or modeling of nitrate values in the field. Agricultural intelligence computer system 130 may identify a difference between the identified nitrate in the field and an optimal amount of nitrate in the field during the particular portion of the crop's development. In the embodiment of a quadratic-plateau function described above, the optimal amount of nitrate for the particular portion of the crop's development is $N^O$. The optimal amount of nitrate, $N^O$, as used herein represents an amount of nitrate in the soil past which the model of relative yield identifies no changes in the relative yield when the nitrate values in the field increase. Thus, to identify an optimal amount of nitrogen to add to the field, agricultural intelligence computer system 130 may first determine a difference between the identified nitrate in the field and the $N^O$ for the particular portion of the crop's development.

In an embodiment, agricultural intelligence computer system 130 computes an amount of nitrogen to add to the field in order for the field to have the optimal amount of nitrate. For example, agricultural intelligence computer system 130 may initially determine a difference between an amount of nitrate currently in the field and an optimal amount of nitrate for a particular portion of the crop's development. Agricultural intelligence computer system 130 may then model nitrate values in the field based on different applications of nitrogen to the field to identify an amount of nitrogen to apply in order to bring the nitrate in the field to the optimal amount of nitrate for the particular portion of the crop's development.

Modeling nitrate based on nitrogen applications may include modeling changes in the nitrate levels of the field over a particular period of time. For example, agricultural intelligence computer system 130 may only have models for the relative yield based on nitrate values during the V8 growth stage. If a farmer requests a recommendation for nitrogen application during the V6 growth stage, agricultural intelligence computer system 130 may model nitrate in the soil up to the V8 growth stage based on different applications of nitrogen in the V6 growth stage. Agricultural intelligence computer system 130 may then identify the application of nitrate during the V6 growth stage that leads to the optimal amount of nitrate in the field at the V8 growth stage.

In an embodiment, agricultural intelligence computer system 130 models different applications of nitrogen on different days to identify a minimum application of nitrogen that leads to the optimal amount of nitrate available on the one or more fields during a particular portion of the crop's development. For example, if agricultural intelligence computer system 130 maintains models of relative yield based on nitrate for a plurality of days or GDDs, agricultural intelligence computer system 130 may model various nitrogen applications for each day to identify the lowest nitrogen application for each day that would lead to the optimal nitrate level in the soil. Of the lowest identified nitrogen applications, agricultural intelligence computer system 130 may identify the overall lowest nitrogen application that leads to optimal nitrate levels in the soil. Additionally and/or alternatively, if agricultural intelligence computer system 130 maintains relative yield models for only a particular portion of the crop's development, agricultural intelligence computer system 130 may select various nitrogen applications for each day and model the nitrate in the soil up to the particular portion of the crop's development based on the selected nitrogen applications. Agricultural intelligence computer system 130 may then identify a nitrogen application of the selected nitrogen applications which leads to the optimal amount of nitrate in the soil during the particular portion of the crop's development and which contains the minimum amount of nitrogen applied to the one or more fields.

Different types of fertilizer may have different effects on the nitrate level in a field. Additionally, different types of fertilizer may cost varying amounts. In an embodiment, agricultural intelligence computer system 130 stores data identifying various types of fertilizer with corresponding effects on nitrate values in soil. For example, a first brand of fertilizer may increase the nitrate in the field by 40 lbs/acre for every 100 lbs/acre of fertilizer added to the field while a second brand of fertilizer may increase the nitrate in the field by 70 lbs/acre for every 100 lbs/acre of fertilizer added to the field. In response to receiving an identification of a particular type of fertilizer, agricultural intelligence computer system 130 may identify an effect on nitrate values in the soil from an application of the particular type of fertilizer. Agricultural intelligence computer system 130 may then identify an optimal amount of the particular type of fertilizer to add to the particular field.

Agricultural intelligence computer system 130 may also store data identifying varying costs of different fertilizers. In an embodiment, agricultural intelligence computer system 130 identifies a least expensive application of nitrogen that leads to the optimal amount of nitrate. For example, a particular fertilizer may require twice as much fertilizer to be applied for the field as all other fertilizers in order to reach the optimal amount of nitrate but cost one third the price of all other fertilizers. Agricultural intelligence computer system 130 may recommend an application of the particular fertilizer because the overall cost of applying the particular fertilizer is lower than the overall cost of applying alternative fertilizers.

In an embodiment, agricultural intelligence computer system 130 uses the nitrogen recommendations to create one or more scripts for application controller 114. For example, agricultural intelligence computer system 130 may determine that on Day Z, an optimal amount of nitrate will be available in a particular field if 70 lbs/acre of Chemical X is applied to the particular field through side dressing. Agricultural intelligence computer system 130 may create a script which, when executed by application controller 114, causes one or more agricultural apparatuses 111 to apply chemical X to the particular field on Day Z in the amount of 70 lbs/acre. Agricultural intelligence computer system 130 may also send a message to field manager computing device 104 identifying the particular field and the recommended application of nitrogen. Agricultural intelligence computer system 130 may request authorization to apply the recommended application of nitrogen to the particular field. In response to receiving authorization from field manager computing device 104, agricultural intelligence computer system 130 may send the one or more scripts to application controller 114.

The techniques described herein may also generate probabilistic recommendations for nitrogen applications. For example, agricultural intelligence computer system 130 may estimate total uncertainty in optimal nitrogen amounts, relative yield values, and total yield values based on model uncertainty, measurement uncertainty, and unknown weather situations. By estimating the uncertainty, agricultural intelligence computer system 130 may display probabilistic estimates for total yield as well as probabilistic recommendations for nitrogen applications. The probabilistic recommendations for nitrogen applications may allow farmers who are more risk averse to make more informed decisions. For instance, agricultural intelligence computer system 130 may indicate that the optimal amount of nitrogen for the field is between 68 lbs/acre and 72 lbs/acre. If a farmer wished to ensure the maximum yield for the crop, the farmer may apply 72 lbs/acre of nitrogen to the field. Thus, a probabilistic recommendation of 68 lbs/acre to 72 lbs/acre gives a farmer more information than a point recommendation of 70 lbs/acre.

4.3 Crop Yield Modeling

In an embodiment, agricultural intelligence computer system 130 combines the techniques described herein with a total crop yield model to identify a total yield for the crop based on nitrate in the soil. For example, a crop yield model, such as the one described in U.S. patent application Ser. No. 14/675,992, the entire contents of which are hereby incorporated by reference as if fully set forth herein, may identify a total crop yield based on weather, soil type, seed type, planting density, planting date, historical yields, and any other factors that may affect the yield of the crop. Agricultural intelligence computer system 130 may use the model of relative yield for the particular field to augment the identified total crop yield.

In the embodiment described above, the relative yield is computed as a quotient of the maximum yield for the field and the actual yield for the field. Thus, the relative yield of the crop falls between zero and one. In cases where sampling from the function described above returns a value above one, agricultural intelligence computer system 130 may reduce the value to one. Agricultural intelligence computer system 130 may compute the product of the total modeled yield with the modeled relative yield based on nitrate application to identify a total yield based on a specific nitrate value in the soil during a particular portion of the crop's development. In an embodiment, agricultural intelligence computer system 130 also computes the difference between the total modeled yield and the total yield based on the specific nitrate value.

Agricultural intelligence computer system 130 may send the total yield based on the specific nitrate value in the soil to field manager computing device 104. Additionally, agricultural intelligence computer system 130 may send data identifying the total yield with an optimal amount of nitrate in the soil and data identifying a minimum amount of nitrogen to apply for the field to reach the optimal amount of nitrogen. By displaying the current modeled total yield along with a total yield with sufficient nitrate, agricultural intelligence computer system 130 is able to provide a farmer with the data necessary to make an intelligent decision regarding the farmer's crops. For example, a farmer may decide the difference in yield values does not justify an additional application of nitrogen even though there is insufficient nitrate.

In an embodiment, agricultural intelligence computer system 130 also provides an interface for inputting a planned application of nitrogen. Based on the type of nitrogen and the amount of the application, agricultural intelligence computer system 130 may estimate the change in the total yield for the crop and provide the difference to field manager computing device 104. Using this method, agricultural intelligence computer system 130 gives a farmer additional control over management of the farmer's crops. A farmer may initially enter a first application of a first amount of nitrogen and receive a result indicating a total crop yield based on the first application. If the farmer is dissatisfied with the result, the farmer may enter a second application of a second amount of nitrogen and receive a result indicating a total crop yield based on the second application. Thus, the farmer is better able to select a nitrogen application that optimizes the total yield in a way that is tailored to the farmer.

In an embodiment, agricultural intelligence computer system 130 identifies a financially optimal application of nitrogen for a particular field. For example, agricultural intelligence computer system 130 may receive data identifying revenue per unit of corn at a particular location from field manager computing device 104 or an external data source. Agricultural intelligence computer system 130 may also receive pricing information for each type of fertilizer. Based on the price of fertilizer and the revenue per unit of corn, agricultural intelligence computer system 130 may compute, for each type of fertilizer and each application of nitrogen, a difference between the total revenue of the field with the application of nitrogen and the cost of the application of nitrogen. Agricultural intelligence computer system 130 may then identify a particular application of nitrogen which maximizes the difference between the revenue of the field and the cost of the particular application of nitrogen.

4.4 Optimizing Crop Yield Modeling

As discussed above, in some embodiments the agricultural intelligence computer system 130 identifies a financially optimal application of nitrogen for a particular field. In some embodiments, determining the financially optimal application of nitrogen involves optimizing an objective function that returns the expected revenue as a result of applying a given amount of fertilizer (F) at a given time or date (D). The units of measurement for F and the format used to quantify D are not critical. For example, F may be measured using any reasonable metric such as grams, kilograms, pounds, and so forth. As another example, D may represent a date of the year, a particular growth stage of a crop, a number of days since planting, and so forth. In some embodiments, the objection function takes the following form:

$$R(F,D) = p_Y EY(F,D) - p_F F - p_I I_{F>0}$$

where R is the expected revenue, $p_Y$ is the crop price, $p_F$ is the fertilizer cost, $p_I$ is the fixed labor cost, EY(F,D) is the expected yield, and $I_{F>0}$ is an indicator function. If the value of F is positive (i.e. some fertilizer is applied), then I{F>0}=1. If the value of F=0, then I{F>0}=0. Thus, the labor cost only has an impact on the model if at least some fertilizer is applied. Therefore, according to the equation above, the estimated revenue is derived by subtracting the cost of fertilizer and the labor cost of applying the fertilizer to the field from the total revenue earned from selling the crops.

Optimizing the aforementioned equation thus includes discovering the amount of fertilizer and date of application which yields the greatest profit. In some embodiments, EY(F,D) is calculated using any of the models discussed herein. However, the techniques discussed in this section could be applied to virtually any model of crop yield based on amount and date of fertilizer application. The variables $p_Y$, $p_F$, and $p_I$, are assumed to be constants, which may be input via a user interface of the agricultural intelligence computer system 130, pulled from the model data and field data repository 160 or the external data 110, or a combination of both. For example, the agricultural intelligence computer system 130 may receive as input the size of an agricultural field, and then consult other external databases for the estimated price at which the crop will sell, fertilizer costs, and labor costs.

Although the equation above optimizes based on an amount of fertilizer and date of application, other embodiments may optimize over different independent variables. For example, some embodiments may assume that the date of application is fixed and thus could be represented as an additional constant variable. As another example, the type of fertilizer may be added as an additional variable, with the effectiveness of the fertilizer being represented in the expected yield model and the price being for a particular amount and type instead of only being based on the amount. The expected yield models described above could be modified without undue experimentation to take into account virtually any independent variables utilized by the objective function and the optimization techniques described in this section are applicable to virtually any objective function. However, the objective function above where the independent variables are amount of fertilizer (F) and date of application (D) is used herein as an illustrative example.

The equation above is only one potential objective function that could be optimized using the techniques described in this section. In other embodiments, the objective function may instead represent only the expected yield EY(F,D) and thus the optimization may only consider the total expected yield from applying a particular amount of fertilizer without considering the cost of the fertilizer or the labor cost of applying the fertilizer. As another example, the techniques described in this section could be used to optimize relative yield, as opposed to total yield or revenue derived from the total yield. Furthermore, the techniques described in this section may be used to optimize revenue or expected yield regardless of the underlying model used to calculate the expected yield.

When optimizing an objective function, most classical optimization approaches work under the assumption that the objective function (and in some cases first and/or second derivatives of the objective function) can be computed quickly. However, in many cases, the objective function may in fact be expensive and time consuming to compute. Thus, in addition to providing an accurate optimization based on the amount of fertilizer and application date, the optimization technique utilized may also take into consideration how long it will take to return an answer to the user 102. For example, in many real-time systems, responses that fall within the 25 second range are generally considered acceptable. However, even if the estimated crop yield could be computed in only one second, this implies that the objective function could only be evaluated ~20-23 times (factoring in other unrelated overhead) before the time window has elapsed. Since many optimization techniques require hundreds, if not thousands or hundreds of thousands, of evaluations to compute an optimal result, embodiments which are designed to return quick solutions are limited in the approaches which can be taken.

In some embodiments, in order to minimize the number of evaluations of the objective function, Bayesian optimization is employed. Employing Bayesian optimization may comprise assuming the objective function is a "black box" while making little to no assumptions as to the mathematical structure of the objective function when performing the optimization.

Agricultural intelligence computer system 130 may employ Bayesian optimization by first obtaining a corpus of observations by sampling the objective function. For example, in the expected revenue equation described above, sampling the objective function may involve selecting n sets of values for (F,D) and evaluating the objective function with those inputs to generate corresponding revenues. A surrogate function is then generated which is trained/fit based on the corpus of observations. Typically, the surrogate function is considerably simpler than the objective function itself and is capable of being evaluated in a relatively cheap manner. Thus, the expensive objective function is instead being estimated using a cheap surrogate function which approximates the behavior of the objective function. Then, a utility function (also referred to as an acquisition function) is generated based on the surrogate function. The utility function is a function which, when optimized, determines the next set of input values (F,D) that should be sampled from the objective function. The utility function typically represents a trade-off between exploration, using input values where the present knowledge of the objective function is very uncertain, and exploitation, using input values where the objective function is expected to be high. For example, in order to avoid being caught in a local maxima, the utility function may prioritize exploration when the objective function is largely unknown at specific portions of the input state space. However, the utility function may switch to prioritizing maximization of the objective function as more information is gained regarding the shape of the objective function. Depending on the embodiment, the utility function may maximize exploration, exploitation, or a weighted combination of both concepts.

After receiving a recommendation from the utility function as to the next set of inputs to explore within the objective function, the set is then evaluated using the objective function to produce a new observation. This new observation is then added to the corpus and the process repeats until a stopping criteria is met. For example, the stopping criteria may be a threshold number of iterations or when convergence is reached. Thus, agricultural intelligence computer system 130 executed Bayesian optimization by estimating the complex objective function with a surrogate function that is more efficient to evaluate and using a utility function that is based on the surrogate function to determine the next point to explore within the solution space of the objective function. When the algorithm completes, the observation point which produced the maximum value of the objective function is taken as the optimal solution.

The following is an example of Bayesian optimization as applied to the above objective function. Let $Y \in \mathbb{R}$ be a random variable that is indexed by $x \in X \subseteq \mathbb{R}^d$. A collection of random variables, $\{Y(x):x \in X\}$ is called a stochastic process. A Gaussian process is a collection of random variables, $\{Y(x):x \in X\}$, such that any finite subset, $\{Y(x): x \in A \subseteq X, A \text{ is finite}\}$, has a joint Gaussian distribution. A Gaussian process is a specific kind of stochastic process which is represented by a mean function, $m(x;\theta)$ and a kernel function, $k(x,x';\theta)$ and is written as $$Y(x) \sim GP(m(x), k(x,x'), \theta)$$

which means, $$Y(x) \sim \mathcal{N}(m(x), k(x,x'))$$

$$Y_{1:t} \sim \mathcal{N}(m, K)$$

in which, $$Y_{1:t} = \begin{bmatrix} Y(x_1) \\ Y(x_2) \\ \vdots \\ Y(x_t) \end{bmatrix}$$

$$m = \begin{bmatrix} m(x_1) \\ m(x_2) \\ \vdots \\ m(x_t) \end{bmatrix}$$

$$K = \begin{bmatrix} k(x_1, x_1) & k(x_1, x_2) & \ldots & k(x_1, x_t) \\ k(x_2, x_1) & k(x_2, x_2) & \ldots & k(x_2, x_t) \\ \vdots & \vdots & & \vdots \\ k(x_t, x_1) & k(x_t, x_2) & \ldots & k(x_t, x_t) \end{bmatrix}$$

One potential choice for mean and kernel functions are $$m(x; \theta) = \mu$$

$$k(x, x'; \theta) = \sigma^2 \exp\left(-\sum_{i=1}^{d} \alpha_i |x_s - x'_t|^{Fs}\right)$$

which correspond to the constant mean and anisotropic exponential kernel. The matrix K is called the covariance matrix.

Agricultural intelligence computer system 130 may model the objective function using the following model $$Y_{noise}(x_t) = Y(x_t) + \epsilon_c \quad \epsilon_t \sim \mathcal{N}(0, \sigma_{noise}^2)$$

The independent variable $x \in \mathbb{R}^d$ of the GP is in fact the optimization variable and the dependent (random) variable $Y_{noise}(x)$ represents an approximation of the objective function evaluated at x. For the objective function in this case, $x=(F,D)$, $d=2$, and $Y_{noise}(x)$ approximates $R(F,D)$.

The parameters of the GP are collectively represented by $\theta$ as $$\theta = [\mu \sigma \sigma_{noise} \alpha_1 \ldots \alpha_d p_1 \ldots p_d]$$

To accurately model the objective function, the above GP is fit to the objective function. In some embodiments, the GP is fit to the objective function using maximum likelihood estimation (MLE) or Bayesian inference and an estimate of parameters, $\hat{\theta}$ is obtained. In order to fit the GP, the objective function is evaluated or "sampled" at a set of initial design points. In an embodiment, the initial design points are selected using a Latin hypercube design and the number of initial design points is chosen to be 10d. However, the initial design points could be selected using virtually any number of techniques, such as pure random sampling, and virtually any number of initial design points could be selected. Depending on which embodiment is utilized, the agricultural intelligence computing system 130 may attempt to minimize the number of initial design points, since each represents an evaluation of the objective function. For example, the designer of the agricultural intelligence computing system 130 may have a goal run-time and the initial starting points may be determined based on a percentage of the total run-time and the average time it takes for the expected yield model to be evaluated. Thus, a percentage of the total runtime can be dedicated to generating the initial design points and a portion may be reserved for determining and testing new design points. The collection of design points and corresponding objective function values is referred to as the current design dataset.

Using the estimated parameters, $\hat{\theta}$, the noisy Gaussian process given by $Y_{noise}(x)$ is expected to be a reasonably good fit to the objective function $R(x)$, in which $x=(F,D)$. This noisy GP, $Y_{noise}(x)$, is referred to as the prior. Agricultural intelligence computer system 130 proceeds by iteratively adding new design points to the design dataset. A new design point is selected by optimizing a utility function u(x). The utility function is an information function that provides a numerical measure at every point x, of either the (1) uncertainty of the GP approximation of the objective function, or (2) likelihood that x is the maximum of the objective function, or (3) a combination of both. For example, an embodiment may use a utility function that is based on the variance of the posterior. In this example, a design point $x_{t+1}$ that corresponds to a smaller variance $\sigma_{t+1}^2$, indicates that more information about the value of the objective function is known at that point. Thus, one choice would be to minimize the variance $\sigma_{t+1}^2(x_{t+1})$ as a function of $x_{t+1}$. In this case, the utility function to be maximized would be $$u(x) = -\sigma_{t+1}^2(x)$$

The next design point, $x_{t+1}$ is then given by, $$x_{t+1} = \arg\max_z u(x)$$

subject to the constraints of the of the original optimization problem.

However, there are alternative utility functions which could be employed. For example, assuming $x_{t+1}$ is the initial design point. Then the distribution of $Y_{noise}(x)$ conditioned on all the previous information is $$Y_{noise}(x_t)|y_1, \ldots y_t \sim \mathcal{N}(\mu_{t+1}(x_{t+1}), \sigma_{t+1}^2(x_{t+1}))$$

in which, $$\mu_{t+1}(x_{t+1}) = m(x_{t+1}) + k^T(K + \sigma_{noise}^2 I)^{-1} y_{|x}$$

$$\sigma_{t+1}^2(x_{t+1}) = k(x_{t+1}, x_{t+1}) + \sigma_{noise}^2 - k^T(K + \sigma_{noise}^2 I)^{-1} k$$

In some embodiments, the covariance matrix of the noisy GP, $K + \sigma_{noise}^2 I$, is inverted. Thus, one incentive for using a noisy GP (as opposed to a non-noisy GP) is that the noise variance $\sigma_{noise}^2$ provides numerical stability while inverting the covariance matrix. The noise variance $\sigma_{noise}^2$ is also referred to as the jitter or nugget.

Thus, according to an embodiment, the overall algorithm used by agricultural intelligence computer system 130 for Bayesian Optimization is as follows:
1. Select initial set of design points $A = \{x_1, x_2, \ldots x_t\}$
2. Fit $Y_{noise}(x)$ to the function $f(x)$ to obtain $\theta$.
3. Obtain the posterior distribution $Y_{noise}(x)|y, y_2, \ldots y_t$
4. Optimize the utility function to obtain the next design point $x_{t+1}$
5. Stopping rule: If $EI(x_{t+1}) < 0.01 f_{current\ best}$ or maximum number of iterations reached, then stop, where EI represents the expected improvement based on the utility function and $0.01 f_{current\ best}$ represents a threshold for convergence. The scaling factor 0.01 is not fixed and may be changed in alternative embodiments.
6. Update the posterior distribution to include the new observation $(x_{t+1}, f(x_{t+1}))$
7. Set $t = t+1$ and return to step 3.

Fitting the objective function as represented above may in some embodiments produce anomalous results. The discontinuity of the equation if $R(F, \bullet)$ at $F=0$ poses a challenge when fitting a GP. A GP fitted to the objective function surface that includes the discontinuity at $F=0$ provides a poor representation of the objective function surface around the optimal. The aforementioned issue may be resolved by optimizing over the domain $F>0$ separately and then comparing the optimal revenue against the revenue at $F=0$. Since the revenue at $F=0$ is constant regardless of D, only one function evaluation is required to compute the revenue for the case of no fertilizer application.

In some cases, GP fitting can suffer from various numerical issues when the design space is not properly scaled. For the objective function above, the design space has $d=2$ dimensions, F and D. In some embodiments, F and D are linearly rescaled to fall within the range [0, 1]. To rescale F to [0, 1], a small, non-zero lower bound can be chosen for F. In general, the lower bound can be set to a small amount of fertilizer that is unlikely to have any significant effect on revenue/crop yield, such as 0.01 lb/acre. Similarly, an upper bound representing an amount of fertilizer that is likely to over-fertilize the field to the point where no additional gains in revenue/crop yield are obtained can be chosen, such as 100 lb/acre. Thus, any value for F can be represented as a linear scale based on the upper and lower bounds. Similarly, assuming D is a day of the year ranging from day 1 to day 365, the current day can be scaled based on the lower bound (1) and upper bound (365).

5. BENEFITS OF CERTAIN EMBODIMENTS

Using the techniques described herein, a computer can deliver total crop yield availability data that would be otherwise unavailable. For example, the techniques herein can determine a relative yield of a field based on the nitrate within the field. The performance of the agricultural intelligence computing system is improved using the techniques described herein which create accurate models with high computational efficiency, thereby reducing the amount of memory used to model effects of nitrate on the total yield of a crop. Specifically, the optimization techniques described herein increase the efficiency of the computer in identifying optimal applications of nitrogen, thus allowing agricultural intelligence computer system to provide accurate estimates of optimal application amounts in a short period of time. Additionally, the techniques described herein may be used to create application parameters for an application controller, thereby improving the performance of farming implements controlled by the application controller.

6. EXTENSIONS AND ALTERNATIVES

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:
1. A method comprising:
using digitally programmed instructions in a server computer, generating a model of crop yield based, at least in part, on one or more constant variables and one or more independent variables;
receiving, over a network at the server computer, electronic digital data comprising one or more values representing the one or more constant variables;
using the digitally programmed instructions in the server computer, sampling the model of crop yield to generate a corpus of observations, wherein each observation in the corpus includes a set of values for the one or more independent variables and a corresponding crop yield based on evaluating the model of crop yield on the set of values for the one or more independent variables;
using the digitally programmed instructions in the server computer, until a stopping condition is reached:
fitting a surrogate function to the model of crop yield based on the corpus of observations, wherein the surrogate function approximates behavior of the model of crop yield,
generating a utility function based on the surrogate function that provides a numerical estimate of information gain that would be obtained by evaluating the model of crop yield at a given set of values for the one or more independent variables,
optimizing the utility function to determine a new set of values for the one or more independent variables that maximizes the information gain,
evaluating the model of crop yield using the new set of values to obtain a corresponding crop yield for the new set of values,
adding the new set of values and the corresponding crop yield for the new set of values to the corpus of observations;
in response to detecting the stopping condition, using the digitally programmed instructions in the server computer, calculating an optimal amount of nitrogen to apply by determining a set of values for the one or more independent variables within the corpus that maximizes the corresponding crop yield;

generating one or more scripts and sending the one or more scripts to an application controller, wherein the one or more scripts are executed by the application controller to cause an agricultural implement to apply the optimal amount of nitrogen to a particular location.

2. One or more non-transitory computer-readable media storing instructions which, when executed by one or more processors, cause performance of:

generating a model of crop yield based, at least in part, on one or more constant variables and one or more independent variables;

receiving electronic digital data comprising one or more values representing the one or more constant variables;

sampling the model of crop yield to generate a corpus of observations, wherein each observation in the corpus includes a set of values for the one or more independent variables and a corresponding crop yield based on evaluating the model of crop yield on the set of values for the one or more independent variables;

a stopping condition is reached:

fitting a surrogate function to the model of crop yield based on the corpus of observations, wherein the surrogate function approximates behavior of the model of crop yield, generating a utility function based on the surrogate function that provides a numerical estimate of information gain that would be obtained by evaluating the model of crop yield at a given set of values for the one or more independent variables, optimizing the utility function to determine a new set of values for the one or more independent variables that maximizes the information gain, evaluating the model of crop yield using the new set of values to obtain a corresponding crop yield for the new set of values, adding the new set of values and the corresponding crop yield for the new set of values to the corpus of observations;

in response to detecting the stopping condition, calculating an optimal amount of nitrogen to apply by determining a set of values for the one or more independent variables within the corpus that maximizes the corresponding crop yield;

generating one or more scripts and sending the one or more scripts to an application controller, wherein the one or more scripts are executed by the application controller to cause an agricultural implement to apply the optimal amount of nitrogen to a particular location.

3. The method of claim 1, wherein the one or more constant variables comprise one or more of a crop price, a fertilizer cost, or a fixed labor cost.

4. The method of claim 1, wherein the one or more independent variables comprise one or more an amount of fertilizer, a date of application, or a type of fertilizer.

5. The method of claim 1, wherein the stopping condition is a threshold number of iterations.

6. The method of claim 1, wherein the stopping condition is a determination that convergence has been reached.

7. The method of claim 1, wherein optimizing the utility function to determine a new set of values comprises fitting a Gaussian process to the model of crop yield through maximum likelihood estimation or Bayesian inference and sampling the new set of values from the Gaussian process.

8. The one or more non-transitory computer-readable media of claim 2, wherein the one or more constant variables comprise one or more of a crop price, a fertilizer cost, or a fixed labor cost.

9. The one or more non-transitory computer-readable media of claim 2, wherein the one or more independent variables comprise one or more an amount of fertilizer, a date of application, or a type of fertilizer.

10. The one or more non-transitory computer-readable media of claim 2, wherein the stopping condition is a threshold number of iterations.

11. The one or more non-transitory computer-readable media of claim 2, wherein the stopping condition is a determination that convergence has been reached.

12. The one or more non-transitory computer-readable media of claim 2, wherein optimizing the utility function to determine a new set of values comprises fitting a Gaussian process to the model of crop yield through maximum likelihood estimation or Bayesian inference and sampling the new set of values from the Gaussian process.

* * * * *